United States Patent
Arai et al.

(10) Patent No.: US 8,638,468 B2
(45) Date of Patent: Jan. 28, 2014

(54) RESOLUTION CONVERSION USING DEVIATION DIRECTION OF A PIXEL VALUE OF AN IMAGE

(75) Inventors: Shigeru Arai, Kanagawa (JP); Kenji Hara, Kanagawa (JP); Toru Misaizu, Kanagawa (JP); Takeshi Saito, Kanagawa (JP); Haruka Saito, legal representative, Kanagawa (JP); Kouta Matsuo, Kanagawa (JP)

(73) Assignee: Fuji Xerox Co., Ltd., Tokyo (JP)

(*) Notice: Subject to any disclaimer, the term of this patent is extended or adjusted under 35 U.S.C. 154(b) by 291 days.

(21) Appl. No.: 12/724,001

(22) Filed: Mar. 15, 2010

(65) Prior Publication Data

US 2011/0063629 A1    Mar. 17, 2011

(30) Foreign Application Priority Data

Sep. 16, 2009  (JP) ................... 2009-214466

(51) Int. Cl.
*G06K 15/00*   (2006.01)

(52) U.S. Cl.
USPC .......................................................... 358/1.2

(58) Field of Classification Search
USPC ............... 358/1.1, 1.2, 1.5, 3.01, 3.06
See application file for complete search history.

(56) References Cited

U.S. PATENT DOCUMENTS 5,390,263 A * 2/1995 Guay et al. ............. 382/270
2008/0310748 A1* 12/2008 Arai et al. ............... 382/252

FOREIGN PATENT DOCUMENTS

| CN | 1531318 | 9/2004 |
| CN | 101325644 | 12/2008 |
| JP | H05-244399 A | 9/1993 |
| JP | H07-250246 A | 9/1995 |
| JP | 2001-189858 A | 7/2001 |
| JP | 2006-262405 A | 9/2006 |

OTHER PUBLICATIONS

Japanese Office Action in corresponding JP Patent Application No. 2009-214466 dated May 30, 2013.
Chinese Office Action issued in corresponding Chinese Patent Application No. 201010135621.2 dated Oct. 30, 2013.

* cited by examiner

*Primary Examiner* — Eric A Rust
(74) *Attorney, Agent, or Firm* — Sughrue Mion, PLLC (57) ABSTRACT

An image processing apparatus includes: a reception unit that receives an image in gray-level representation with respect to a pixel; a determination unit that determines a deviation direction of a pixel value of the pixel in the image received by the reception unit; and a processing unit that performs processing on the image received by the reception unit based on the deviation direction determined by the determination unit.

4 Claims, 16 Drawing Sheets

| PIXEL 1 (0) | PIXEL 2 (0) | PIXEL 3 (0) | PIXEL 4 (0) | PIXEL 5 (0) |
|---|---|---|---|---|
| PIXEL 6 (0) | PIXEL 7 (0) | PIXEL 8 (8) | PIXEL 9 (2) | PIXEL 10 (10) |
| PIXEL 11 (0) | PIXEL 12 (8) | PIXEL 13 (15) | PIXEL 14 (8) | PIXEL 15 (0) |
| PIXEL 16 (0) | PIXEL 17 (2) | PIXEL 18 (8) | PIXEL 19 (0) | PIXEL 20 (0) |
| PIXEL 21 (0) | PIXEL 22 (0) | PIXEL 23 (0) | PIXEL 24 (0) | PIXEL 25 (0) |

PIXEL NAME (PIXEL VALUE)

SCREENED IMAGE DATA

FIG. 4A

| PIXEL 1 | PIXEL 2 | PIXEL 3 |
|---|---|---|
| PIXEL 4 | PIXEL 5 (PIXEL OF INTEREST) | PIXEL 6 |
| PIXEL 7 | PIXEL 8 | PIXEL 9 |

FIG. 4B $$UP = (Din(1) + Din(2) + Din(3))$$

$$DOWN = (Din(7) + Din(8) + Din(9))$$

$$LEFT = (Din(1) + Din(4) + Din(7))$$

$$RIGHT = (Din(3) + Din(6) + Din(9))$$

FIG. 5A

DETERMINATION CONDITION AND FLAG

| DETERMINATION CONDITION 1 | DETERMINATION CONDITION 2 | DETERMINATION CONDITION 3 | FLAG |
|---|---|---|---|
| MAX(UP, DOWN, LEFT, RIGHT) = UP | | | |
| MAX(UP, DOWN, LEFT, RIGHT) = UP, DOWN && Din(2) ≧ Din(8) | Din(1)+Din(4) > Din(3)+Din(6) | — | 0 |
| MAX(UP, DOWN, LEFT, RIGHT) = UP, LEFT && Din(2) ≧ Din(4) | | | |
| MAX(UP, DOWN, LEFT, RIGHT) = UP, RIGHT && Din(2) ≧ Din(6) | | Din(4) ≧ Din(6) | 0 |
| MAX(UP, DOWN, LEFT, RIGHT) = UP, DOWN, LEFT && Din(2) ≧ Din(8) && Din(2) ≧ Din(4) | Din(1)+Din(4) = Din(3)+Din(6) | | |
| MAX(UP, DOWN, LEFT, RIGHT) = UP, DOWN, RIGHT && Din(2) ≧ Din(8) && Din(2) ≧ Din(6) | | Din(4) < Din(6) | 1 |
| MAX(UP, DOWN, LEFT, RIGHT) = UP, LEFT, RIGHT && Din(2) ≧ Din(4) && Din(2) ≧ Din(6) | Din(1)+Din(4) < Din(3)+Din(6) | — | 1 |
| MAX(UP, DOWN, LEFT, RIGHT) = UP, DOWN, LEFT, RIGHT && Din(2) ≧ Din(8) && Din(2) ≧ Din(4) && Din(2) ≧ Din(6) | | | |

FIG. 5B

DETERMINATION CONDITION AND FLAG (CONTINUED)

| DETERMINATION CONDITION | | | | FLAG |
|---|---|---|---|---|
| DETERMINATION CONDITION 1 | DETERMINATION CONDITION 2 | DETERMINATION CONDITION 3 | | |
| MAX(UP, DOWN, LEFT, RIGHT) = DOWN | Din(4)+Din(7) > Din(6)+Din(9) | — | | 2 |
| MAX(UP, DOWN, LEFT, RIGHT) = UP, DOWN && Din(8) > Din(2) | | | | |
| MAX(UP, DOWN, LEFT, RIGHT) = DOWN, LEFT && Din(8) ≧ Din(4) | Din(4)+Din(7) = Din(6)+Din(9) | Din(4) ≧ Din(6) | | 2 |
| MAX(UP, DOWN, LEFT, RIGHT) = DOWN, RIGHT && Din(8) ≧ Din(6) | | Din(4) < Din(6) | | 3 |
| MAX(UP, DOWN, LEFT, RIGHT) = UP, DOWN, LEFT && Din(8) > Din(2) && Din(8) ≧ Din(4) | | | | |
| MAX(UP, DOWN, LEFT, RIGHT) = UP, DOWN, RIGHT && Din(8) > Din(2) && Din(8) ≧ Din(6) | | | | |
| MAX(UP, DOWN, LEFT, RIGHT) = DOWN, LEFT, RIGHT && Din(8) ≧ Din(4) && Din(8) ≧ Din(6) | Din(4)+Din(7) < Din(6)+Din(9) | — | | 3 |
| MAX(UP, DOWN, LEFT, RIGHT) = UP, DOWN, LEFT, RIGHT && Din(8) > Din(2) && Din(8) ≧ Din(4) && Din(8) ≧ Din(6) | | | | |

FIG. 5C

DETERMINATION CONDITION AND FLAG (CONTINUED)

| DETERMINATION CONDITION | | | | FLAG |
|---|---|---|---|---|
| DETERMINATION CONDITION 1 | DETERMINATION CONDITION 2 | DETERMINATION CONDITION 3 | | |
| MAX(UP, DOWN, LEFT, RIGHT) = LEFT | Din(1)+Din(2) > Din(7)+Din(8) | — | | 0 |
| MAX(UP, DOWN, LEFT, RIGHT) = UP, LEFT && Din(4) > Din(2) | | | | |
| MAX(UP, DOWN, LEFT, RIGHT) = DOWN, LEFT && Din(4) > Din(8) | Din(1)+Din(2) = Din(7)+Din(8) | Din(2) ≧ Din(8) | | 0 |
| MAX(UP, DOWN, LEFT, RIGHT) = LEFT, RIGHT && Din(4) ≧ Din(6) | | Din(2) < Din(8) | | 2 |
| MAX(UP, DOWN, LEFT, RIGHT) = UP, DOWN, LEFT && Din(4) > Din(2) && Din(4) > Din(8) | | | | |
| MAX(UP, DOWN, LEFT, RIGHT) = UP, LEFT, RIGHT && Din(4) > Din(2) && Din(4) ≧ Din(6) | Din(1)+Din(2) < Din(7)+Din(8) | — | | 2 |
| MAX(UP, DOWN, LEFT, RIGHT) = DOWN, LEFT, RIGHT && Din(4) > Din(8) && Din(4) ≧ Din(6) | | | | |
| MAX(UP, DOWN, LEFT, RIGHT) = UP, DOWN, LEFT, RIGHT && Din(4) > Din(2) && Din(4) > Din(8) && Din(4) ≧ Din(6) | | | | |

FIG. 5D

| DETERMINATION CONDITION | | | FLAG |
|---|---|---|---|
| DETERMINATION CONDITION 1 | DETERMINATION CONDITION 2 | DETERMINATION CONDITION 3 | |
| MAX(UP, DOWN, LEFT, RIGHT) = RIGHT | Din(2)+Din(3) > Din(8)+Din(9) | — | 1 |
| MAX(UP, DOWN, LEFT, RIGHT) = UP, RIGHT && Din(6) > Din(2) | | | |
| MAX(UP, DOWN, LEFT, RIGHT) = DOWN, RIGHT && Din(6) > Din(8) | Din(2)+Din(3) = Din(8)+Din(9) | Din(2) ≧ Din(8) | 1 |
| MAX(UP, DOWN, LEFT, RIGHT) = LEFT, RIGHT && Din(6) > Din(4) | | | |
| MAX(UP, DOWN, LEFT, RIGHT) = UP, DOWN, RIGHT && Din(6) > Din(2) && Din(6) > Din(8) | | Din(2) < Din(8) | 3 |
| MAX(UP, DOWN, LEFT, RIGHT) = UP, LEFT, RIGHT && Din(6) > Din(2) && Din(6) > Din(4) | | | |
| MAX(UP, DOWN, LEFT, RIGHT) = DOWN, LEFT, RIGHT && Din(6) > Din(8) && Din(6) > Din(4) | Din(2)+Din(3) < Din(8)+Din(9) | — | 3 |
| MAX(UP, DOWN, LEFT, RIGHT) = UP, DOWN, LEFT, RIGHT && Din(6) > Din(2) && Din(6) > Din(8) && Din(6) > Din(4) | | | |

DETERMINATION CONDITION AND FLAG (CONTINUED)

FIG. 6A

RESOLUTION CONVERSION PIXEL TABLE (DOT GROWTH DIRECTION: LEFT UPWARD)

FIG. 6B (1) Din = 0 
(2) Din = 1 
(3) Din = 2 
(4) Din = 3

(5) Din = 4 
(6) Din = 5 
(7) Din = 6 
(8) Din = 7

(9) Din = 8 
(10) Din = 9 
(11) Din = 10 
(12) Din = 11

(13) Din = 12 
(14) Din = 13 
(15) Din = 14 
(16) Din = 15

RESOLUTION CONVERSION PIXEL TABLE (DOT GROWTH DIRECTION: RIGHT UPWARD)

FIG. 6C

RESOLUTION CONVERSION PIXEL TABLE (DOT GROWTH DIRECTION: LEFT DOWNWARD)

FIG. 6D

RESOLUTION CONVERSION PIXEL TABLE (DOT GROWTH DIRECTION: RIGHT DOWNWARD)

FIG. 7

IMAGE CONVERSION PROCESSING FLOW (S10)

FIG. 8A

| PIXEL 1 | PIXEL 2 | PIXEL 3 | PIXEL 4 | PIXEL 5 |
|---|---|---|---|---|
| PIXEL 6 | PIXEL 7 | PIXEL 8 | PIXEL 9 | PIXEL 10 |
| PIXEL 11 | PIXEL 12 | PIXEL 13 | PIXEL 14 | PIXEL 15 |
| PIXEL 16 | PIXEL 17 | PIXEL 18 | PIXEL 19 | PIXEL 20 |
| PIXEL 21 | PIXEL 22 | PIXEL 23 | PIXEL 24 | PIXEL 25 |

FIG. 8B

| PIXEL 1 | PIXEL 2 | PIXEL 3 | PIXEL 4 | PIXEL 5 |
|---|---|---|---|---|
| PIXEL 6 | PIXEL 7 | PIXEL 8 | PIXEL 9 | PIXEL 10 |
| PIXEL 11 | PIXEL 12 | PIXEL 13 | PIXEL 14 | PIXEL 15 |
| PIXEL 16 | PIXEL 17 | PIXEL 18 | PIXEL 19 | PIXEL 20 |
| PIXEL 21 | PIXEL 22 | PIXEL 23 | PIXEL 24 | PIXEL 25 |

FIG. 9A

RESOLUTION CONVERSION PIXEL TABLE
(DOT GROWTH DIRECTION: LEFT UPWARD AND LEFT DOWNWARD)

FIG. 9B

RESOLUTION CONVERSION PIXEL TABLE
(DOT GROWTH DIRECTION: RIGHT UPWARD AND RIGHT DOWNWARD)

RESOLUTION CONVERSION USING DEVIATION DIRECTION OF A PIXEL VALUE OF AN IMAGE

CROSS-REFERENCE TO RELATED APPLICATIONS

This application is based on and claims priority under 35 USC 119 from Japanese Patent Application No. 2009-214466 filed Sep. 16, 2009.

BACKGROUND

Technical Field

The present invention relates to an image processing apparatus and a computer readable medium storing a program.

SUMMARY

Image Processing Apparatus

According to an aspect of the invention, there is provided an image processing apparatus including: a reception unit that receives an image in gray-level representation with respect to a pixel; a determination unit that determines a deviation direction of a pixel value of the pixel in the image received by the reception unit; and a processing unit that performs processing on the image received by the reception unit based on the deviation direction determined by the determination unit.

BRIEF DESCRIPTION OF THE DRAWINGS

Exemplary embodiments of the present invention will be described in detail based on the following figures, wherein.

DETAILED DESCRIPTION

First Exemplary Embodiment

Figure 1:
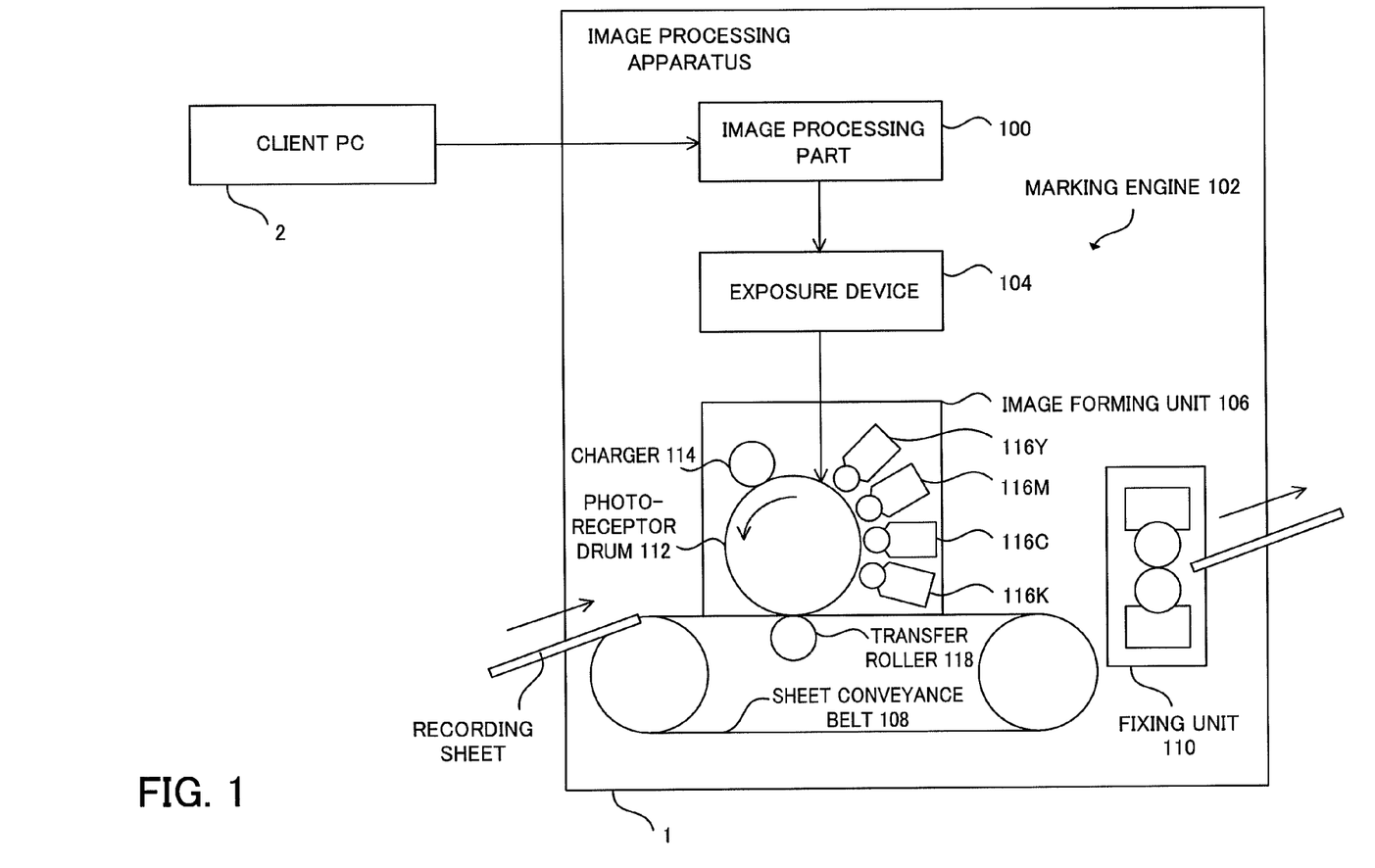
FIG. 1 illustrates an image processing apparatus according to an exemplary embodiment of the present invention.

FIG. 1 illustrates an image processing apparatus 1 according to a first exemplary embodiment of the present invention.

As shown in FIG. 1, the image processing apparatus 1 according to the first exemplary embodiment of the present invention has an image processing part 100 and a marking engine 102.

The image processing apparatus 1 having this configuration performs predetermined processing on input image data, and prints out an image on a recording sheet.

The image processing part 100 is a control circuit board having a CPU, a storage device such as a memory (neither shown) and the like.

The image processing part 100 receives image data from a client PC 2 communicably connected via a cable or the like, and performs predetermined image processing on the image data. Further, the image processing part 100 controls the marking engine 102 such that the image data subjected to the predetermined image processing is printed out on a recording sheet.

The marking engine 102 is a digital color printer based on e.g. a direct transfer method, having an exposure device 104, an image forming unit 106, a sheet conveyance belt 108 and a fixing unit 110.

The exposure device 104 emits light with an LED toward the surface of a charged photoreceptor drum 112, and forms an electrostatic latent image on the surface of the photoreceptor drum 112. The exposure device 104 is capable of image formation in, e.g., 1200 dpi in a main scanning direction and 2400 dpi in a sub scanning direction.

The image forming unit 106 has the photoreceptor drum 112 as an image holder on which an electrostatic latent image is formed and a toner image is held, a charger 114 to uniformly charge the surface of the photoreceptor drum 112, developing rollers 116Y (Yellow), 116M (Magenta), 116C (Cyan) and 116K (blacK) provided for colors used in color image formation, and a transfer roller 118 for transfer of a toner image formed on the surface of the photoreceptor drum 112 to a recording sheet. The image forming unit 106 supplies toner corresponding to an output image from the developing rollers 116Y, 116M, 116C and 116K to the photoreceptor drum 112, to form a toner image from an electrostatic latent image on the surface of the photoreceptor drum 112, and sequentially transfers the toner image onto a recording sheet.

The sheet conveyance belt 108 conveys a recording sheet to a transfer position formed with the photoreceptor drum 112 and the transfer roller 118.

The fixing unit 110 fixes the toner image transferred onto the recording sheet to the recording sheet.

Next, the image processing part 100 in FIG. 1 will be further described.

Figure 2:
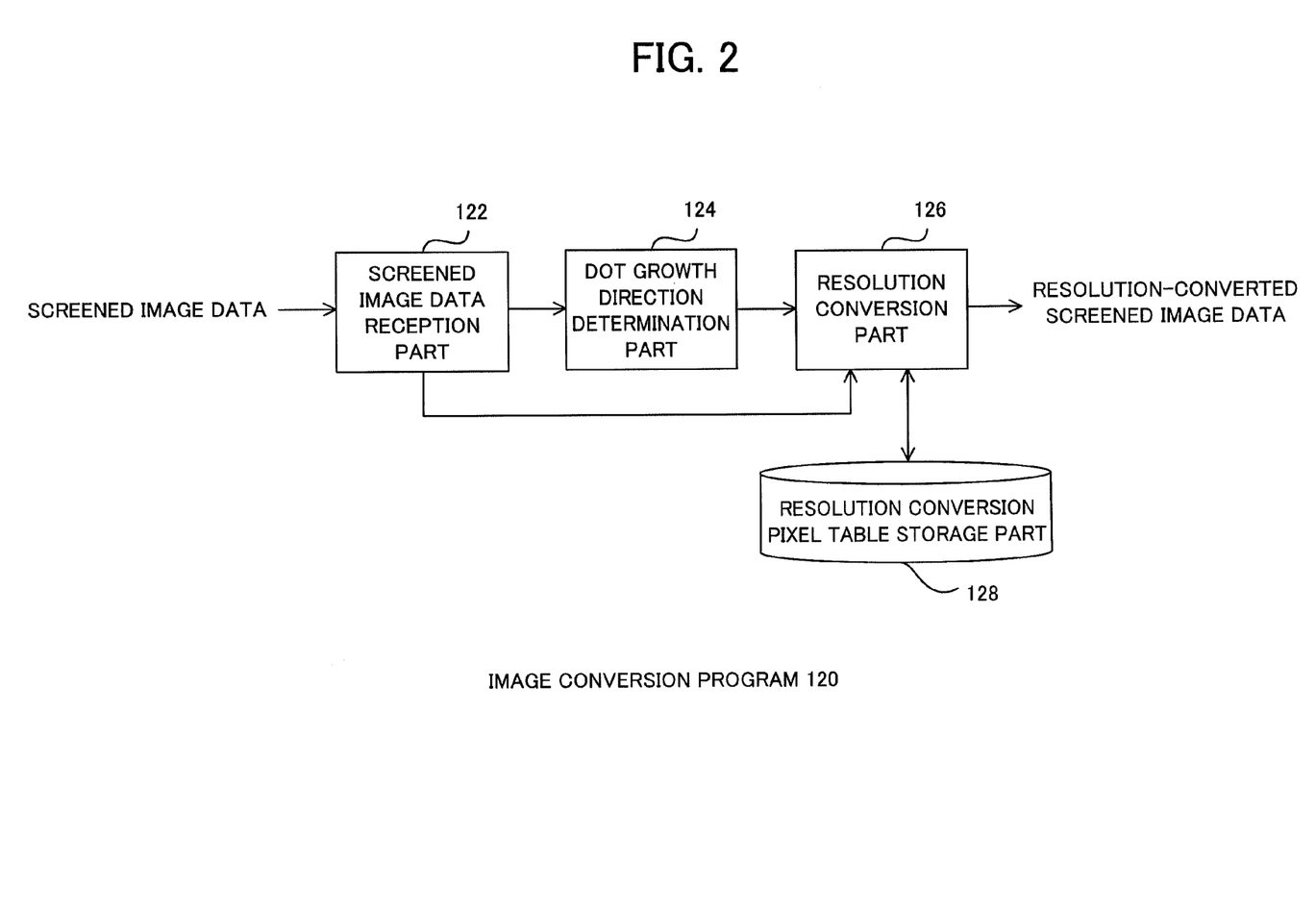
FIG. 2 illustrates a structure of an image conversion program which operates on the image processing apparatus according to the exemplary embodiment of the present invention.

FIG. 2 illustrates a structure of an image conversion program 120 which operates on the image processing part 100. The image processing part 100 reads the image conversion program 120 stored in a memory or the like and executes the program with the CPU. Note that the image conversion program 120 may be stored in a storage device such as a HDD (Hard Disk Drive) or an external recording medium such as a ROM (Read Only Memory), a RAM (Random Access Memory) or a floppy disk (registered trademark).

Note that although image conversion processing by the image conversion program 120 is performed in the same image processing apparatus 1, it may be performed in plural apparatuses (e.g., the image processing apparatus 1 and a server connected via a network).

As shown in FIG. 2, the image conversion program 120 has a screened image data reception part 122, a dot growth direction determination part 124, a resolution conversion part 126 and a resolution conversion pixel table storage part 128. The image conversion program 120 having this structure performs resolution conversion processing on image data subjected to screen processing (hereinbelow, "screened image data").

In this example, the screened image data is assumed to have been subjected to screen processing for a laser exposure device (capable of image formation in resolution of, e.g., 9600 dpi in a main scanning direction and 600 dpi in a sub scanning direction). That is, the resolution of the exposure device assumed for the screened image data (laser exposure device) is different from the resolution of the actually-used exposure device (LED exposure device).

[Screened Image Data Reception Part 122]

Figure 3:
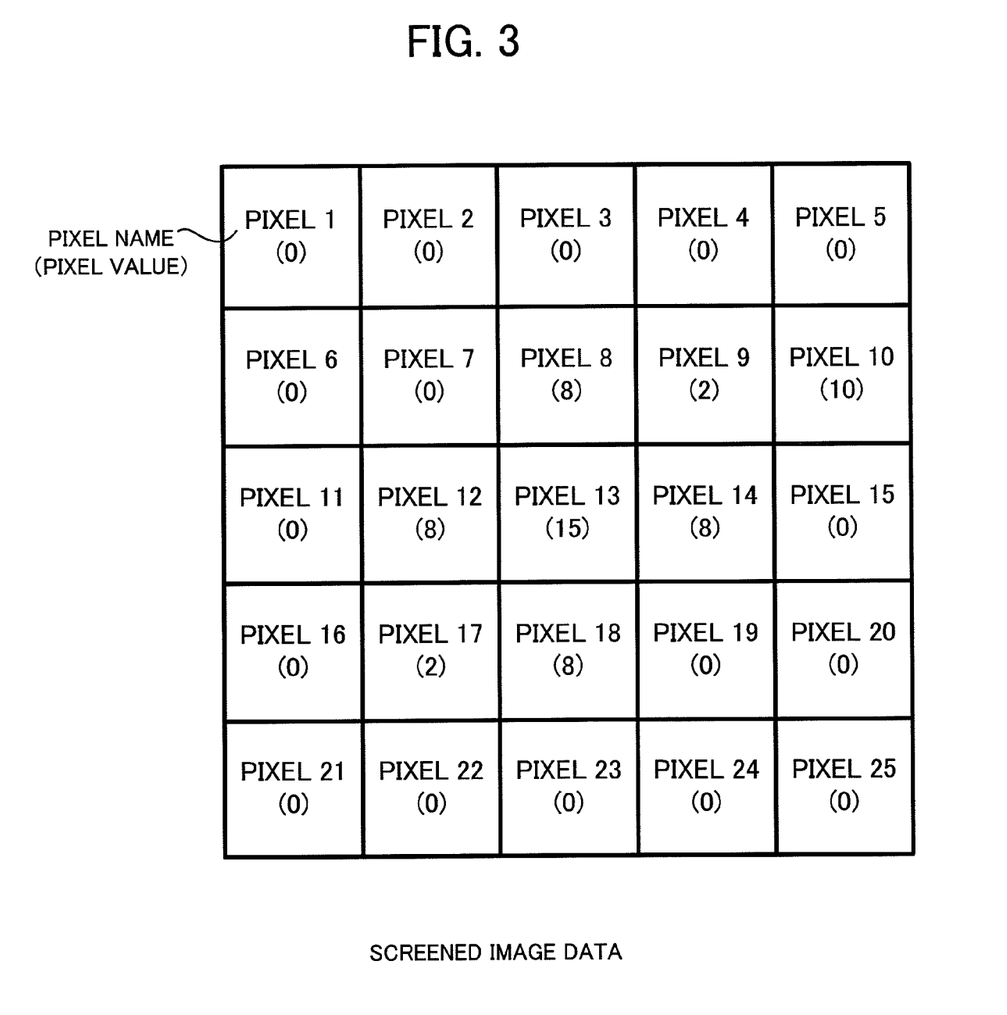
FIG. 3 illustrates an example of screened image data inputted in the image processing apparatus according to the exemplary embodiment of the present invention.

The screened image data reception part 122 receives screened image data as shown in FIG. 3 from the client PC 2 or the like in FIG. 1. As shown in FIG. 3, the screened image data has plural pixels (25 pixels) each having a pixel value. Note that in FIG. 3, the pixel value is indicated as a numeral in parenthesis. In this example, the pixel value is any one of 0 to 15 (16 levels).

More particularly, the screened image data is read into a line memory per line, then, read with a pixel buffer having e.g. 3×3 pixels.

[Dot Growth Direction Determination Part 124]

The dot growth direction determination part 124 determines a dot growth direction in the screened image data received by the screened image data reception part 122. The dot growth direction means a direction in which a pixel is filled in correspondence with a pixel value (a particular example of filling will be described later).

Figure 4A:
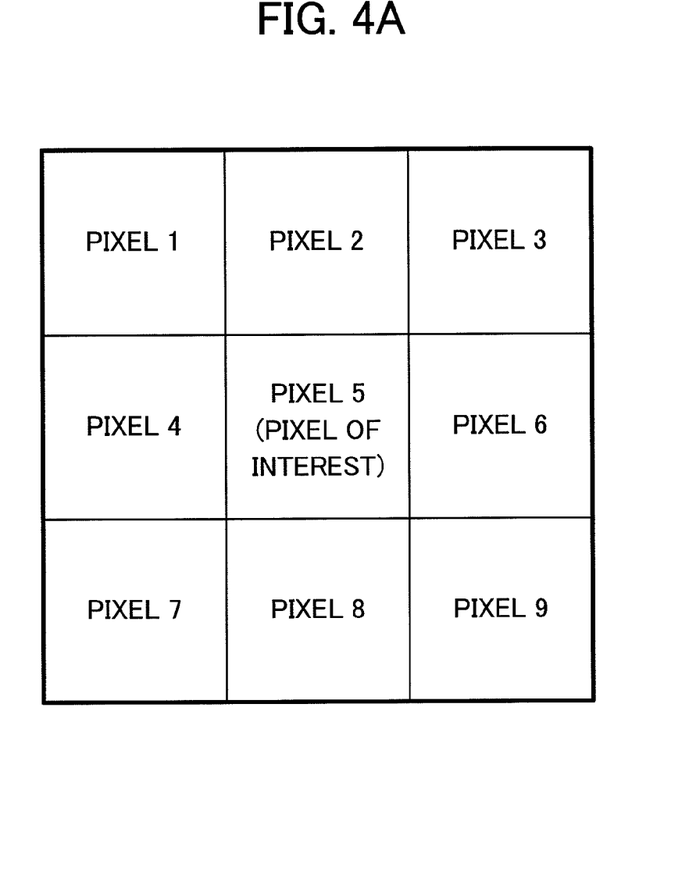
FIGS. 4A and 4B show processing for determination of a dot growth direction.
Figure 4B:
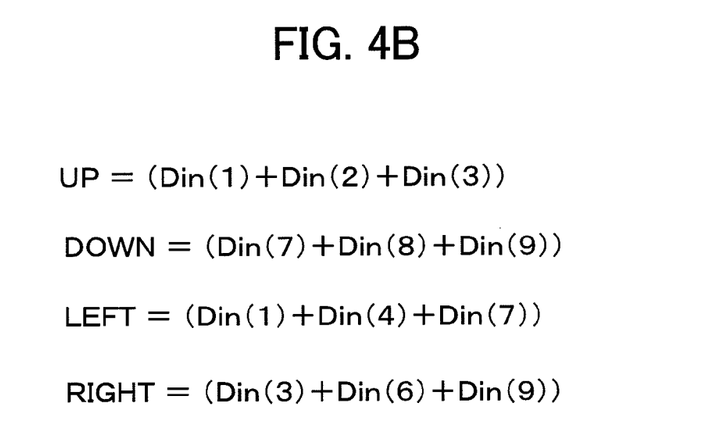
Figure 5A:
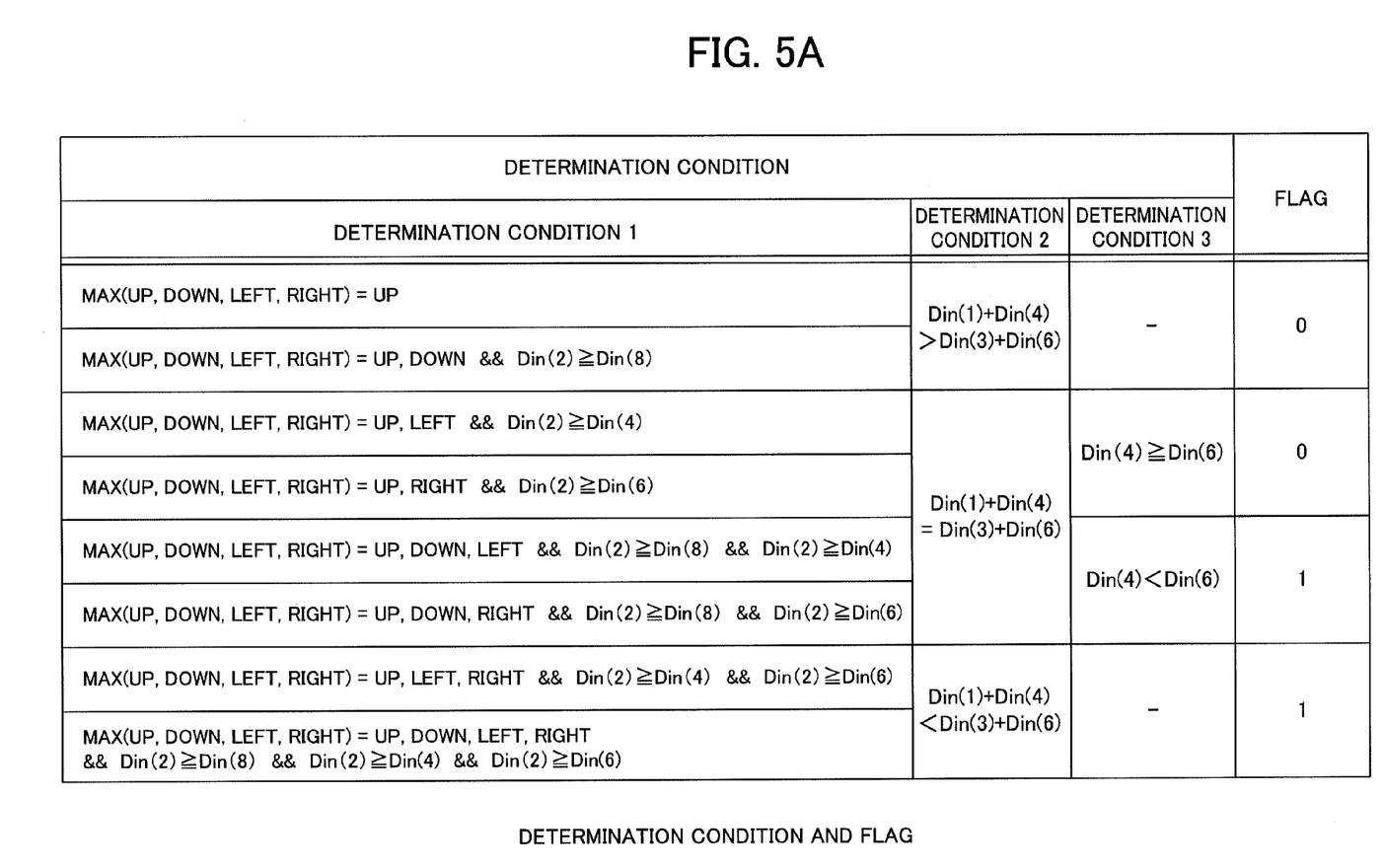
FIG. 5A to 5D are tables for mapping determination conditions for determination of a dot growth direction and determination results.
Figure 5B:
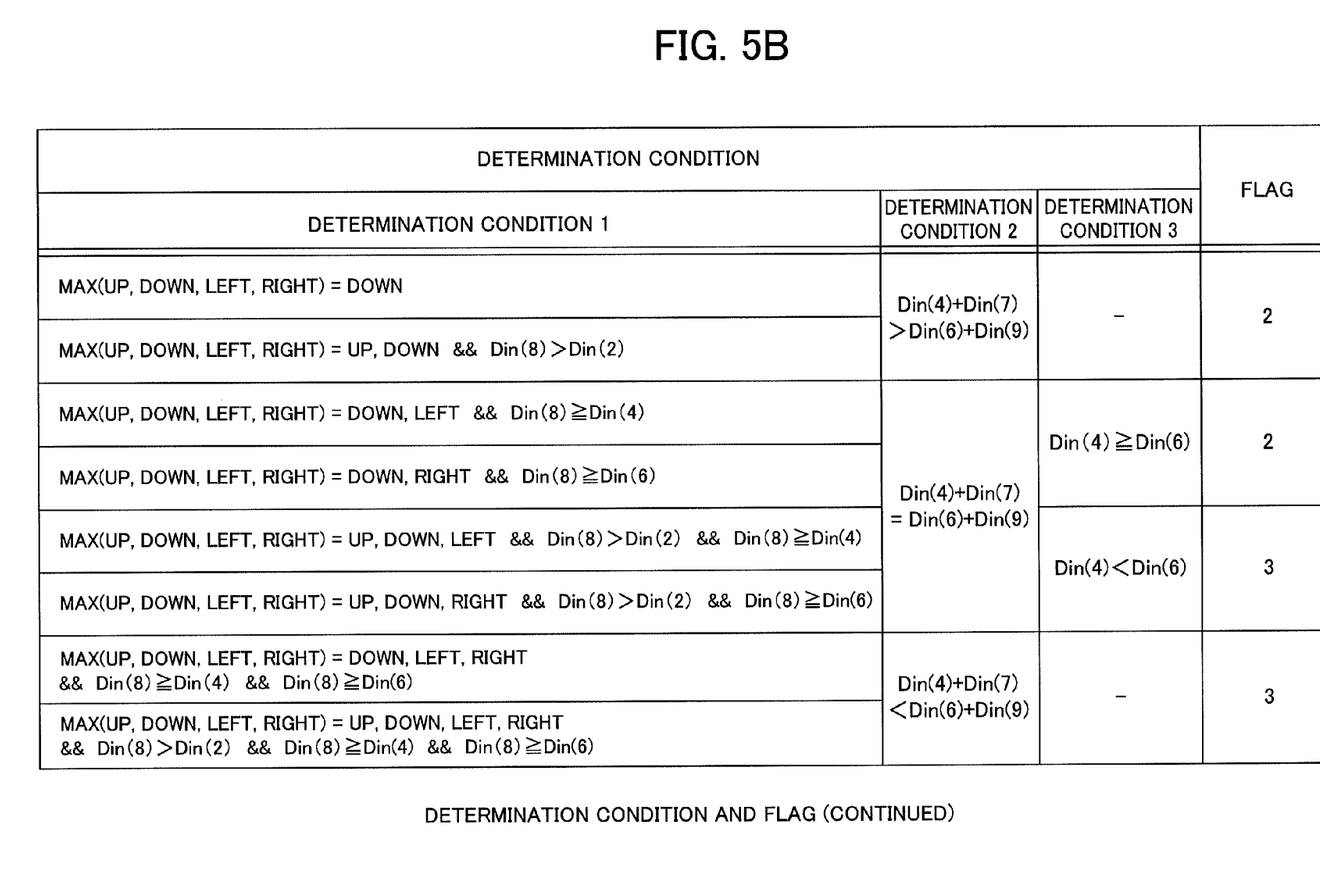
Figure 5C:
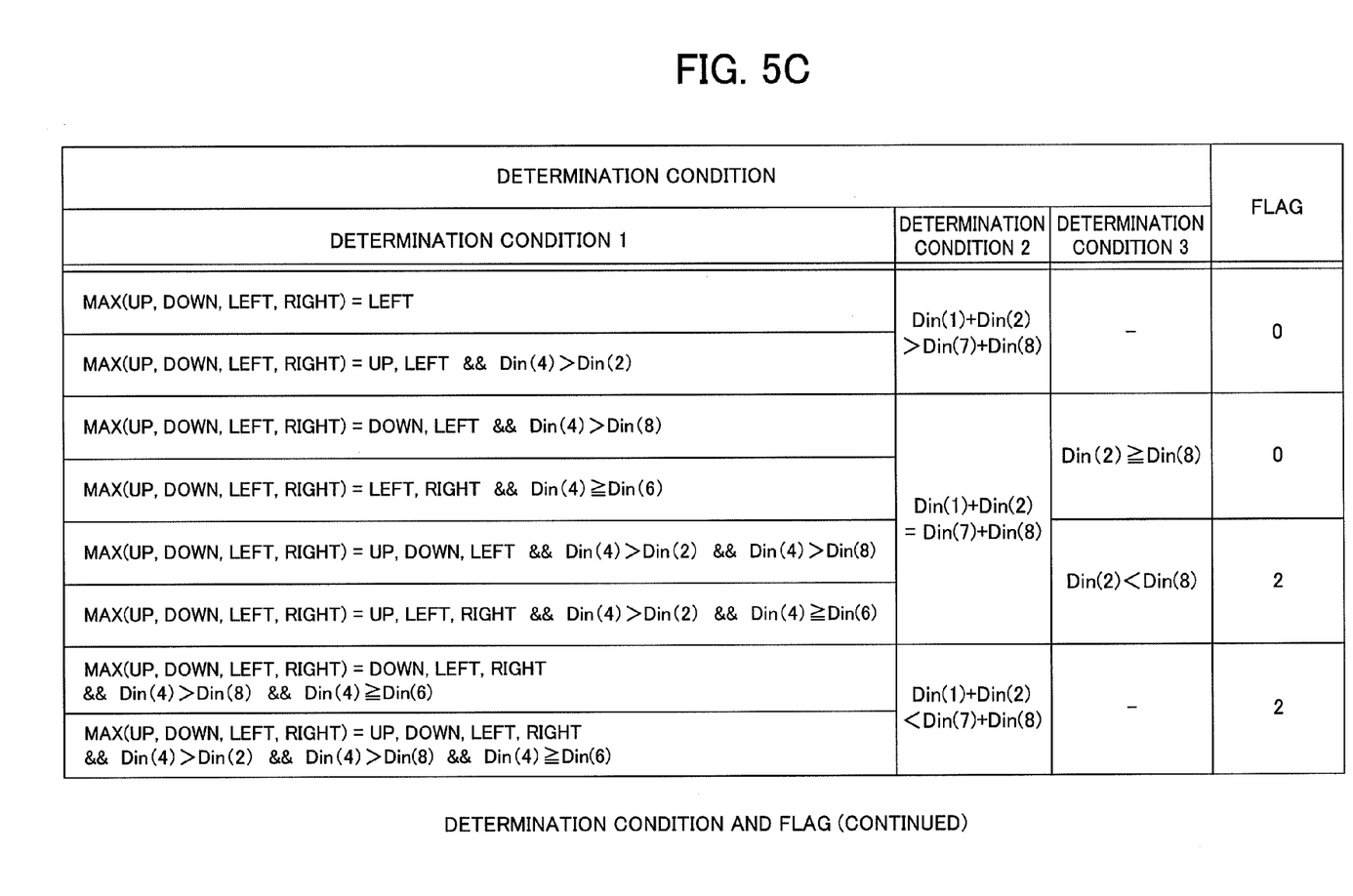
Figure 5D:
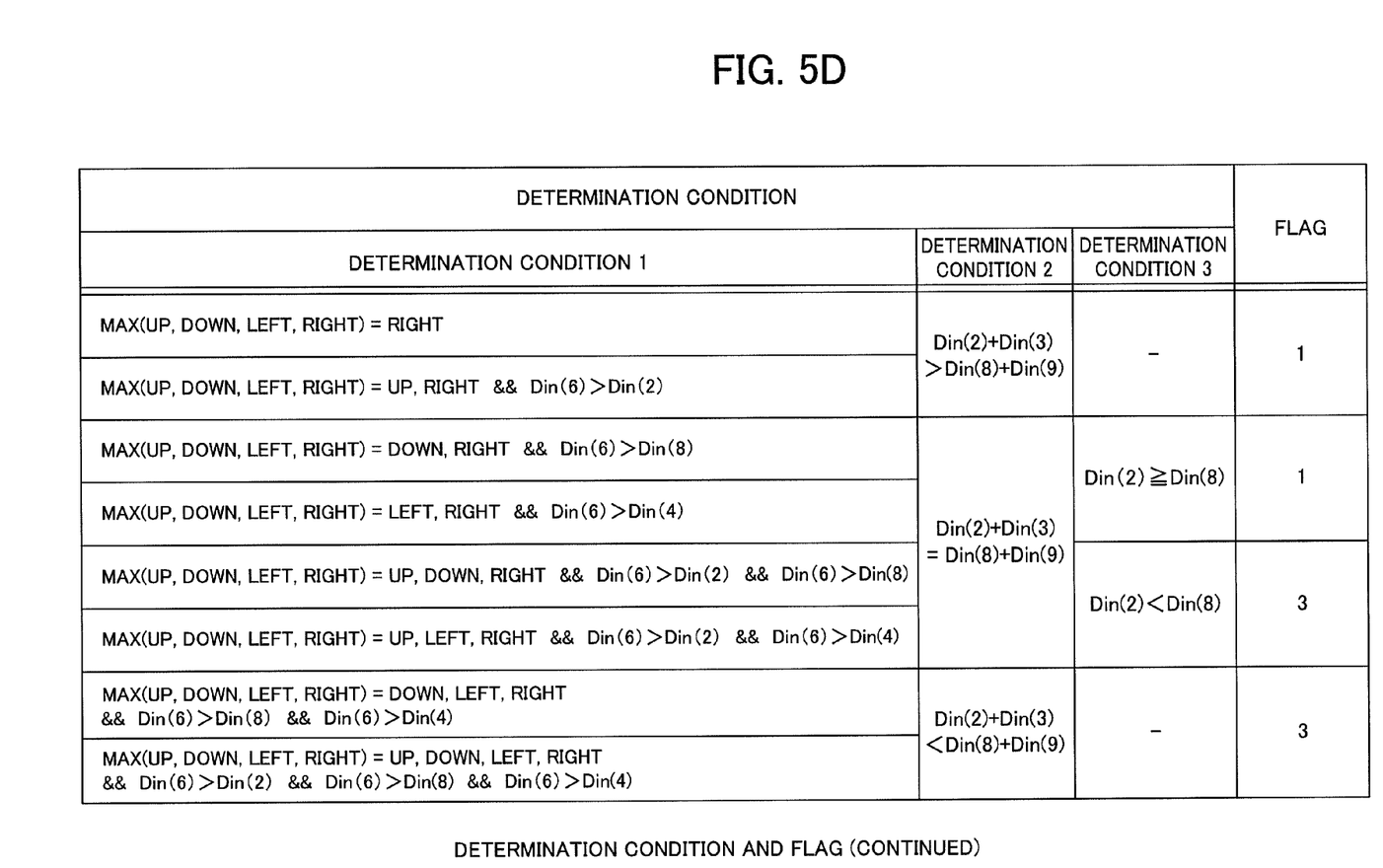

Particularly, first, the dot growth direction determination part 124 scans a pixel group having 3×3 pixels, with a pixel positioned at the center as a pixel of interest as shown in FIG. 4A, in the screened image data, and using an expression shown in FIG. 4B, calculates a sum of pixel values in an upper position ('UP'), a sum of pixel values in a lower position ('DOWN'), a sum of pixel values in a left position ('LEFT'), and a sum of pixel values in a right position ('RIGHT') in the pixel group. Note that in FIG. 4B, 'Din(X)' means a pixel value of a pixel X (hereinbelow, this expression of pixel value is similarly made in other figures).

Next, the dot growth direction determination part 124 determines one of determination conditions as shown in FIGS. 5A to 5D which each calculated sum of pixel values satisfies, and outputs a flag corresponding to the result of determination. For example, among the calculated sums of pixel values, when 'UP' is a maximum value and the sum of pixels 1 and 4 is greater than that of pixels 3 and 6, a flag '0' is outputted.

Note that in the determination condition 1 in FIGS. 5A to 5D, the right side of equation is e.g. 'UP, DOWN' when both of 'UP' and 'DOWN' are maximum values.

Further, in FIGS. 5A to 5D, the flag '0' indicates that it is determined that the dot growth direction is left upward; a flag '1' indicates that it is determined that the dot growth direction is right upward; a flag '2' indicates that it is determined that the dot growth direction is left downward; and a flag '3' indicates that it is determined that the dot growth direction is right downward.

[Resolution Conversion Part 126]

The resolution conversion part 126, using the pixel values of the pixels forming the screened image data received by the screened image data reception part 122 and a resolution conversion pixel table corresponding to the flag outputted from the dot growth direction determination part 124, performs resolution conversion processing on the respective pixels forming the screened image data. Particularly, the respective pixels of the screened image data are replaced with pixels after corresponding resolution conversion.

The resolution conversion pixel table links the pixel values of the pixels forming the screened image data to the resolution-converted pixels. Further, the resolution conversion pixel table is previously stored in a resolution conversion pixel table storage part 128 such that the directions of pixel filling are different in correspondence with flag values.

In FIGS. 6A to 6D, as described above, the resolution of the exposure device 104 in FIG. 1 is 1200×2400 dpi, and therefore a 600×600 dpi image, for example, is formed in 2×4 positions per pixel. In this example, as the pixel values of the pixels forming the screened image data are greater, the number of images to be filled, among the 2×4 images, is greater.

Note that the "filling" means setting a color density higher than that in unfilled portions. In this example, a filled portion is indicated as a hatched portion (hereinbelow, the indication of filled portion is similarly made in the figures).

Figure 6A:
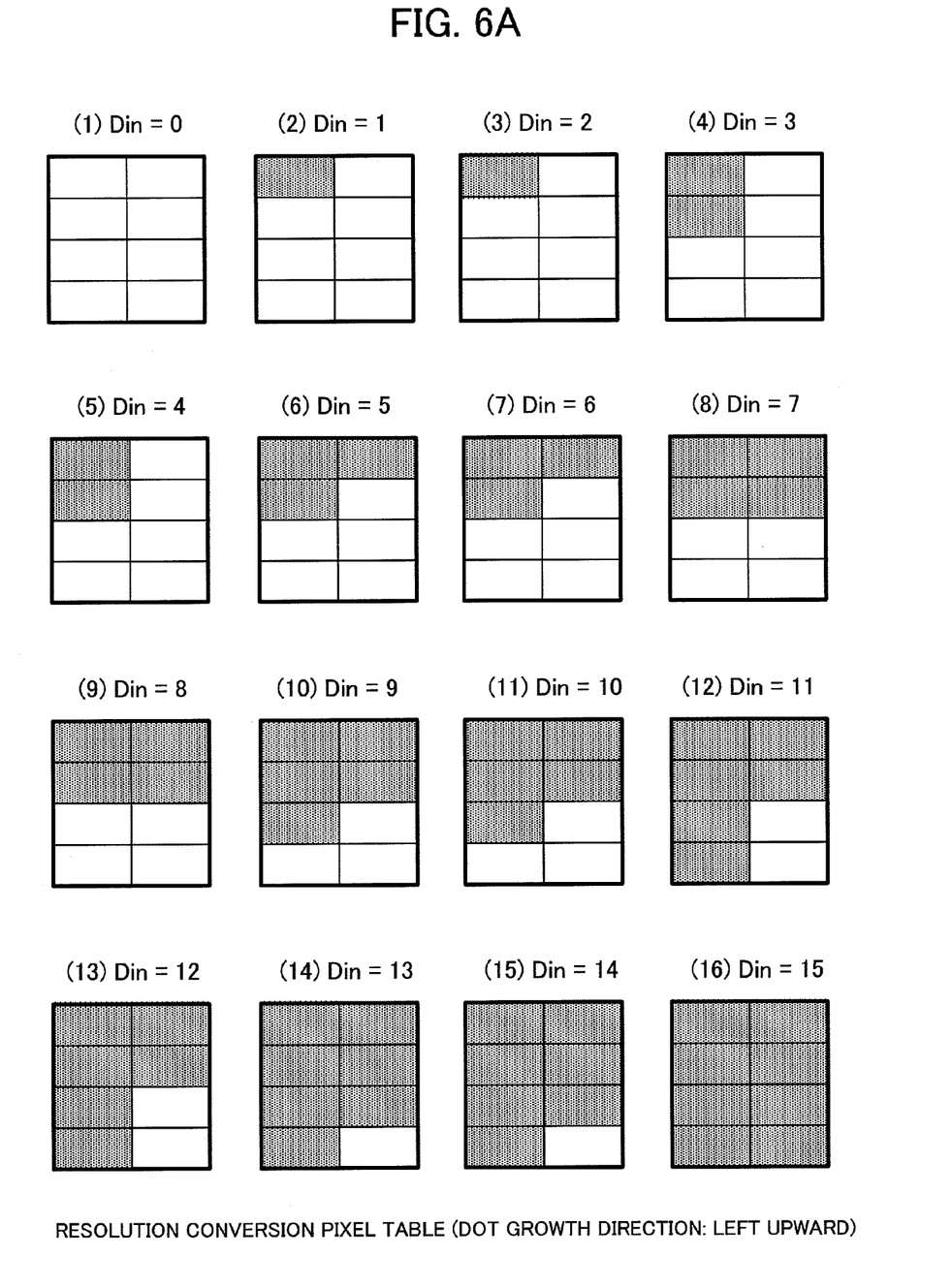
FIG. 6A illustrates a resolution conversion pixel table used when the dot growth direction is left upward.
Figure 6B:
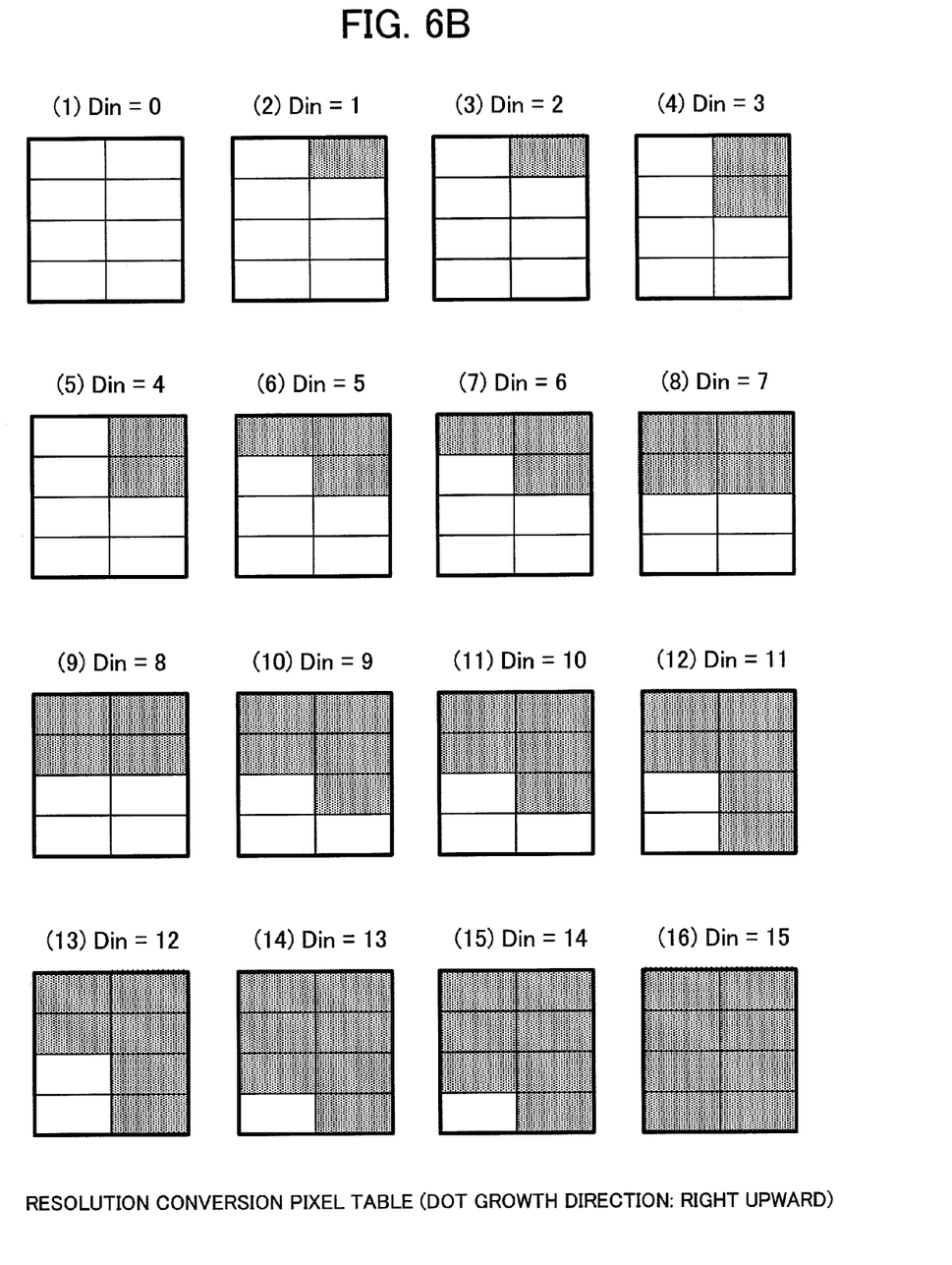
FIG. 6B illustrates a resolution conversion pixel table used when the dot growth direction is right upward.
Figure 6C:
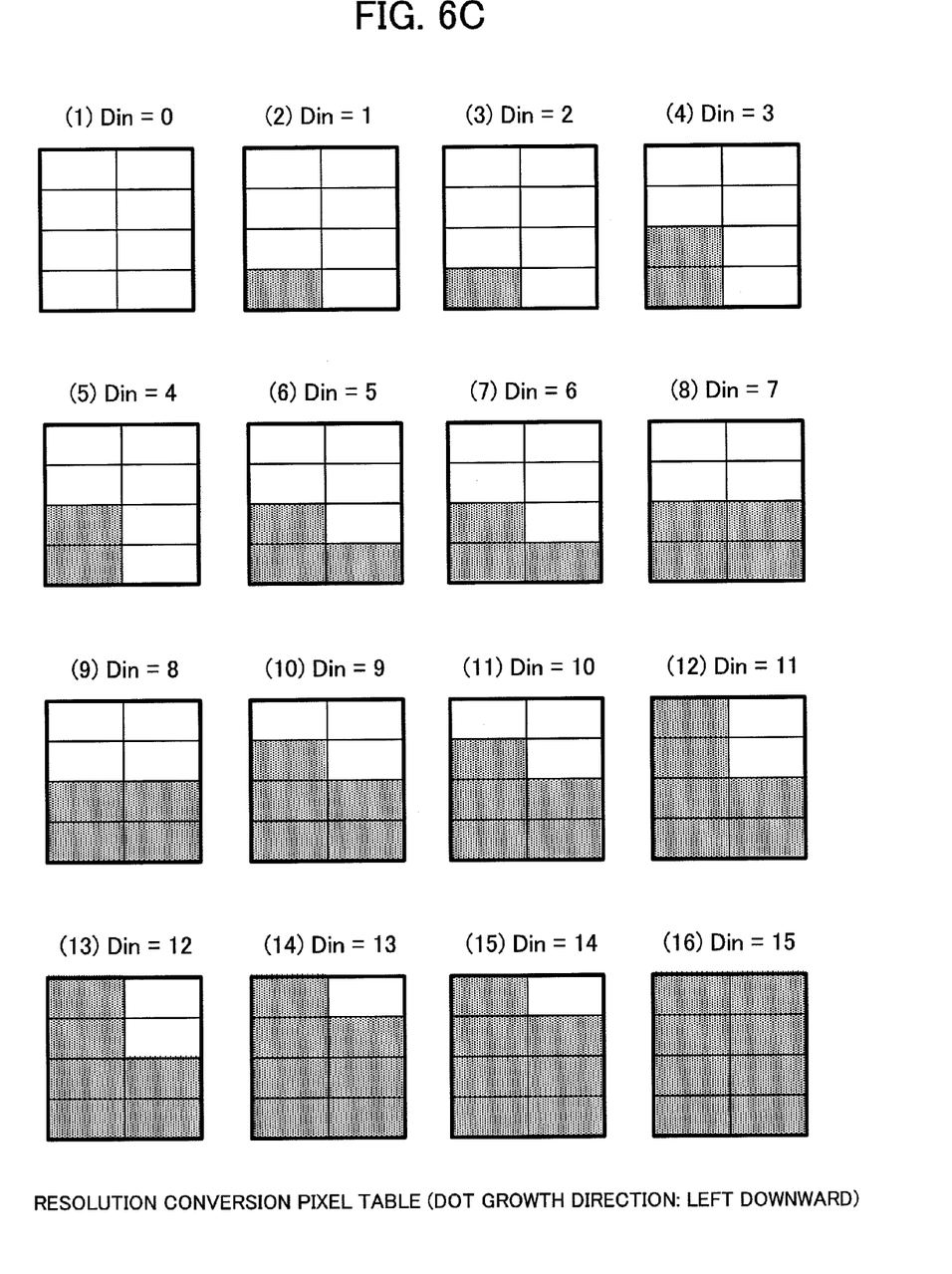
FIG. 6C illustrates a resolution conversion pixel table used when the dot growth direction is left downward.
Figure 6D:
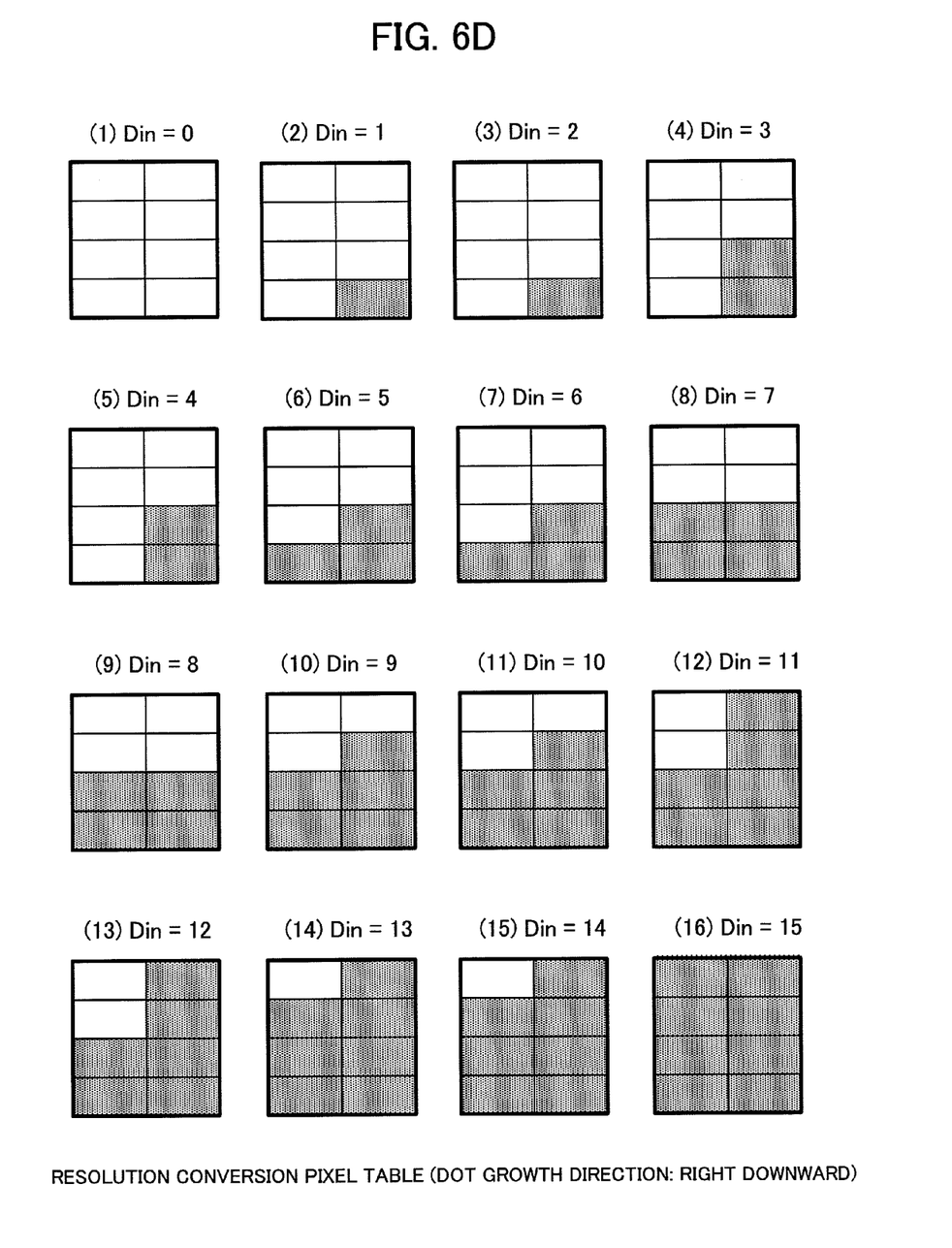
FIG. 6D illustrates a resolution conversion pixel table used when the dot growth direction is right downward.

FIG. 6A illustrates a resolution conversion pixel table used when the flag is '0' (that is, the dot growth direction is left upward); FIG. 6B illustrates a resolution conversion pixel table used when the flag is '1' (that is, the dot growth direction is right upward); FIG. 6C illustrates a resolution conversion pixel table used when the flag is '2' (that is, the dot growth direction is left downward); and FIG. 6D illustrates a resolution conversion pixel table used when the flag is '3' (that is, the dot growth direction is right downward).

Further, a pixel (1) in FIGS. 6A to 6D is used as a resolution-converted pixel when the pixel value is '0'; a pixel (2) in FIGS. 6A to 6D is used as a resolution-converted pixel when the pixel value is '1'. Then a pixel (16) in FIGS. 6A to 6D is used as a resolution-converted pixel when the pixel value is '15'.

Figure 7:
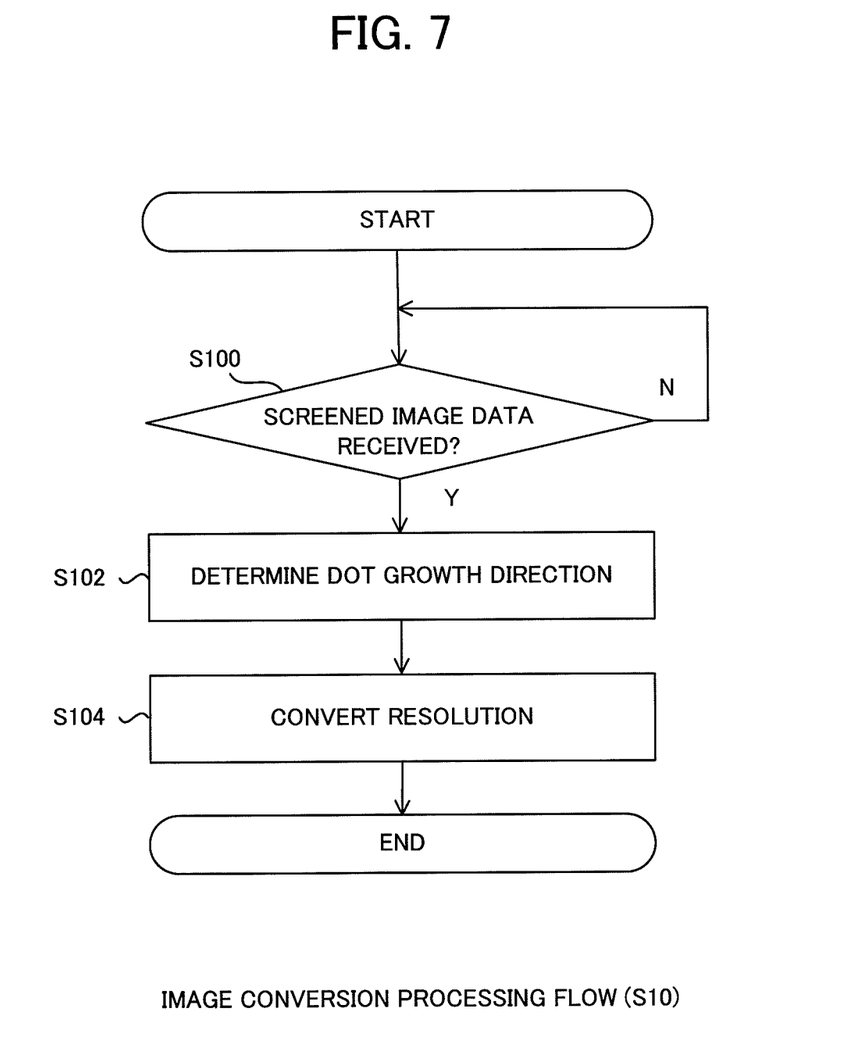
FIG. 7 is a flowchart showing image conversion processing.

FIG. 7 is a flowchart showing image conversion processing (S100) by the image conversion program 120 in FIG. 2.

As shown in FIG. 7, at step S100, it is determined whether or not the screened image data reception part 122 in FIG. 2 has received screened image data. When it is determined that the screened image data reception part 122 has received screened image data, the process proceeds to step S102, otherwise, the determination at step S100 is repeated until the screened image data reception part 122 receives screen image data.

At step S102, the dot growth direction determination part 124 in FIG. 2 determines the dot growth direction of the screened image data received at step S100. Note that in a case where the dot growth direction of the screened image data is previously known, the determination at step S102 is omitted.

At step S104, the resolution conversion part 126 in FIG. 2 performs resolution conversion processing on the screened image data based on the pixel values of the screened image data received at step S100 and the dot growth direction determined at step S102.

Hereinbelow, referring to FIG. 8, the effect of execution of resolution conversion processing on screened image data appropriate to a laser exposure device based on the pixel values and the dot growth direction as well as image formation using a LED exposure device will be described.

Figure 8A:
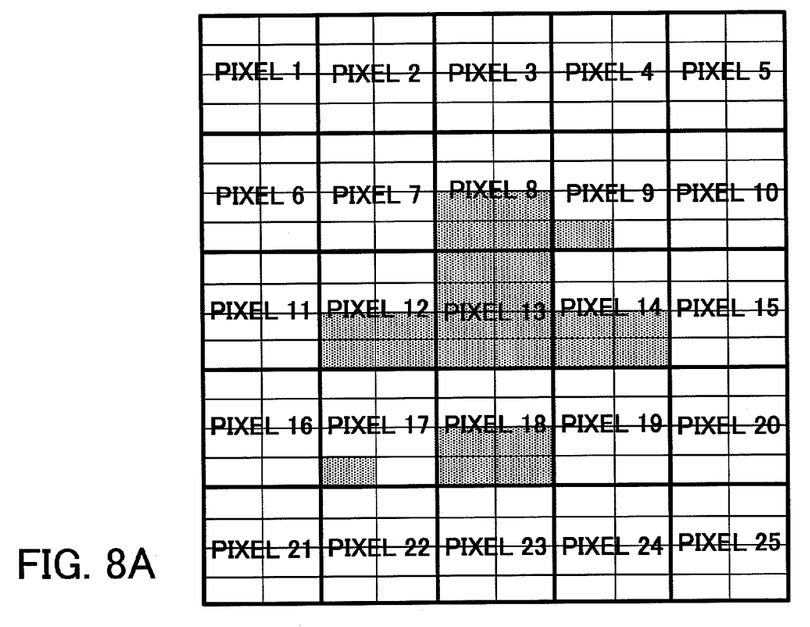
FIGS. 8A and 8B show effects of the present invention.

FIG. 8A shows a case where image formation is performed using a LED exposure device without resolution conversion processing on screened image data shown in FIG. 3 for a laser exposure device. As shown in FIG. 8A, in this case, in pixels 17 and 18, although dot filling is performed in correct ratio, dots are not connected and gray-level jump occurs.

Figure 8B:
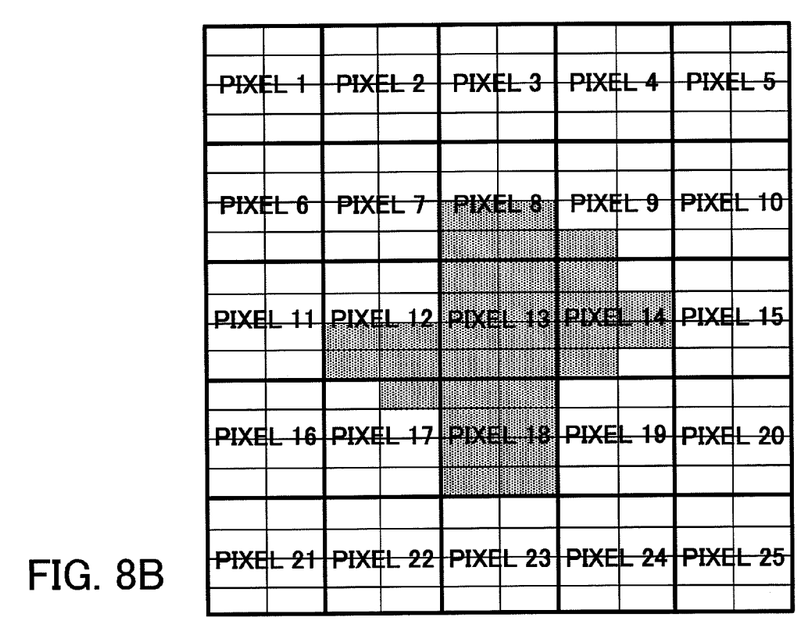

FIG. 8B shows a case where resolution conversion processing is performed on the screened image data for the laser exposure device and image formation is performed using the LED exposure device. As shown in FIG. 8B, in this case, the dots are connected and no gray-level jump occurs.

In the above description, the exposure device assumed to be used for the screened image data is a laser exposure device and the actually used exposure device is an LED exposure device; however, the relationship may be reversed. That is, the exposure device assumed to be used for the screened image data may be the LED exposure device and the actually used exposure device may be the laser exposure device. Hereinbelow, such case will be described.

Second Exemplary Embodiment

In the image processing apparatus 1 according to a second exemplary embodiment of the present invention, the exposure device 104 in FIG. 1 is capable of formation of an electrostatic latent image on the surface of the photoreceptor drum 112 by emitting a laser beam as well as image formation in resolution of 600 dpi in a sub scanning direction and 9600 dpi in a main scanning direction.

Figure 9A:
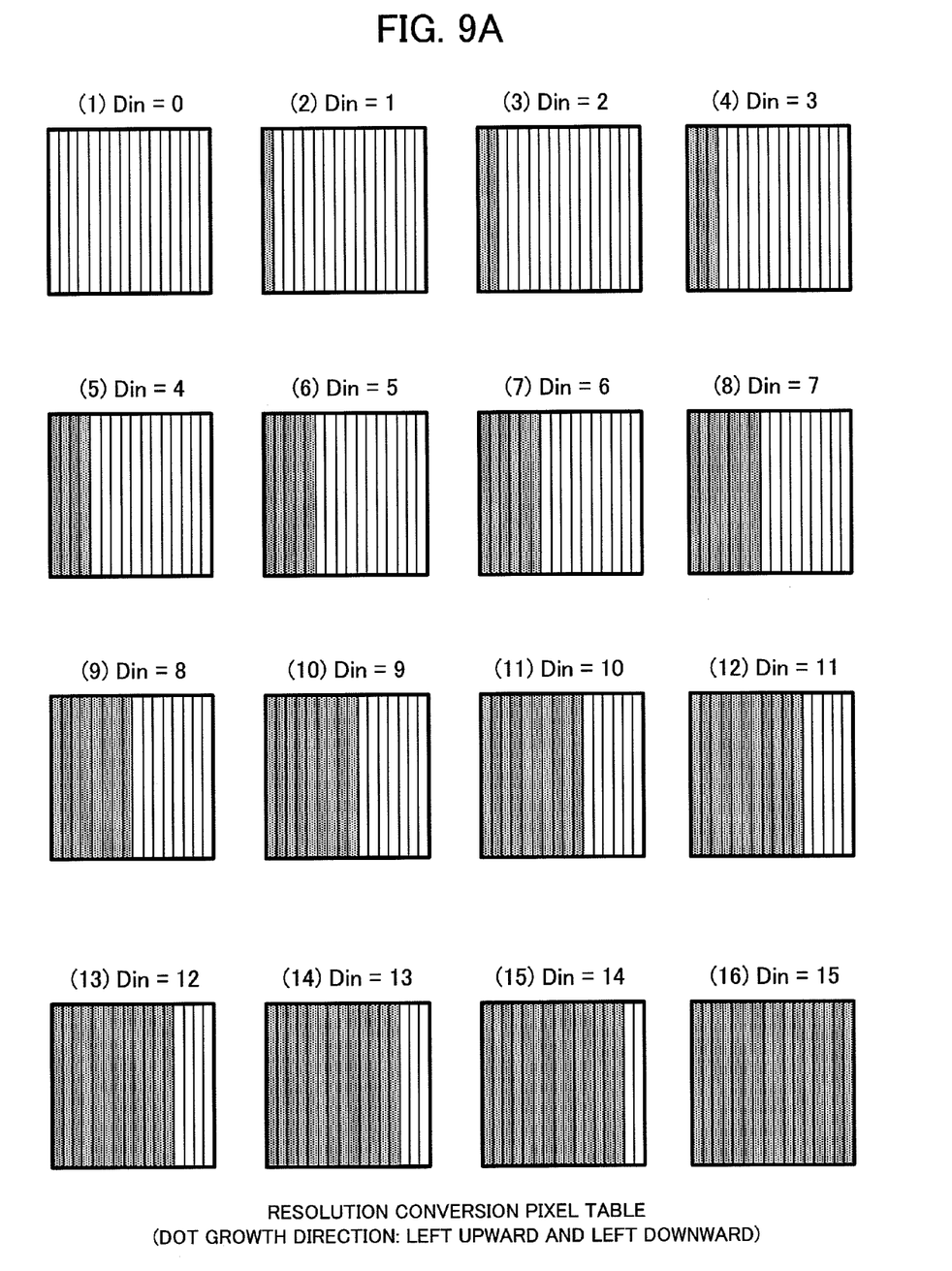
FIG. 9A illustrates the resolution conversion pixel table used when the dot growth direction is left upward and left downward.
Figure 9B:
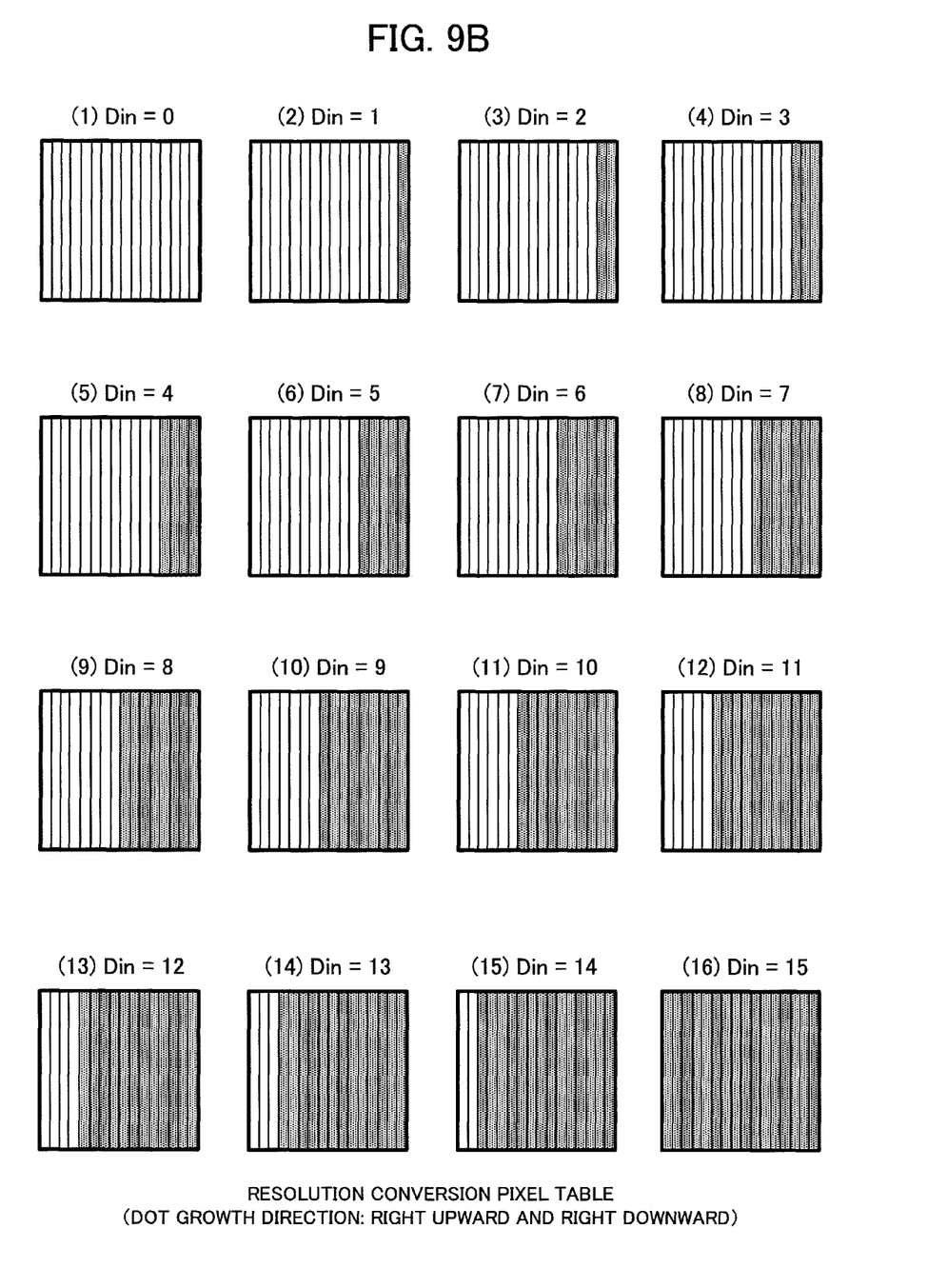
FIG. 9B illustrates the resolution conversion pixel table used when the dot growth direction is right upward and right downward.

FIGS. 9A and 9B show an example of the resolution conversion pixel table previously stored in the resolution conversion pixel table storage part 128 in FIG. 2. Since the resolution of the exposure device 104 in FIG. 1 is 9600×600 dpi, a 600×600 dpi image, for example, is formed in 16×1 positions in per pixel.

FIG. 9A illustrates the resolution conversion pixel table used when the flag outputted from the dot growth direction determination part 124 in FIG. 2 is '0' (that is, the dot growth direction is left upward) and the flag is '2' (that is, the dot growth direction is left downward). Further, FIG. 9B illustrates the resolution conversion pixel table used when the flag is '1' (that is, the dot growth direction is right upward) and the flag is '3' (that is, the dot growth direction is right downward).

In this manner, even when the exposure device assumed to be used for the screened image data is an LED exposure device and the actually used exposure device is a laser exposure device, similar image conversion can be realized by changing the resolution conversion pixel table.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
a reception unit that receives an image;
a determination unit that determines a deviation direction of a pixel value of pixels in the image received by the reception unit; and
a processing unit that performs processing on the image received by the reception unit based on the deviation direction determined by the determination unit,
wherein the determination unit scans a pixel group having a predetermined number of pixels in the image received by the reception unit, and based on pixel values of peripheral pixels of a pixel of interest in the pixel group, determines the deviation direction of the pixel value of the pixel, and
wherein the determination unit divides the pixel group into a plurality of unit pixel groups in correspondence with positions with respect to the pixel of interest, and determines a position of a unit pixel group, having a maximum sum of pixel values of pixels forming the unit pixel group among the all divided unit pixel groups, as the deviation direction of the pixel value of the pixel.

2. The image processing apparatus according to claim 1, wherein the determination unit determines a combination of positions of adjacent unit pixel groups, having maximum sums of pixel values of pixels forming the adjacent unit pixel groups, among the all divided adjacent unit pixel groups, as the deviation direction of the pixel value of the pixel.

3. A non-transitory computer readable medium storing a program for causing a computer to execute a process comprising:
receiving an image in gray-level representation with respect to a pixel;
determining a deviation direction of a pixel value of the pixel in the received image; and
performing processing on the received image based on the determined deviation direction,
wherein the determining a deviation direction comprises:
scanning a pixel group having a predetermined number of pixels in the image received by the reception unit;
dividing the pixel group into a plurality of unit pixel groups in correspondence with positions with respect to the pixel of interest, and
determining a position of a unit pixel group, having a maximum sum of pixel values of pixels forming the unit pixel group among the all divided unit pixel groups, as the deviation direction of the pixel value of the pixel.

4. An image processing apparatus comprising:
a reception part that receives an image;
a determination part that determines a deviation direction of pixels in the image with respect to a pixel of interest, the deviation direction being determined from a plurality of directions with respect to the pixel of interest; and
a processing part that performs resolution conversion processing on the image using the determined deviation direction,
wherein the determination part scans a pixel group having a predetermined number of pixels in the image and including the pixel of interest, and based on pixel values of peripheral pixels of the pixel of interest determines the deviation direction,
wherein the determination part divides the pixel group into a plurality of unit pixel groups in correspondence with the plurality of directions with respect to the pixel of interest, and determines a direction of a unit pixel group, having a maximum sum of pixel values of pixels forming the unit pixel group among the all divided unit pixel groups, as the deviation direction.

* * * * *